United States Patent
Mueller

(10) Patent No.: US 9,791,288 B2
(45) Date of Patent: Oct. 17, 2017

(54) METHOD AND SYSTEM FOR DISPLAYING NAVIGATION INSTRUCTIONS

(75) Inventor: Mario Mueller, Hannover (DE)

(73) Assignee: ROBERT BOSCH GMBH, Stuttgart (DE)

(*) Notice: Subject to any disclaimer, the term of this patent is extended or adjusted under 35 U.S.C. 154(b) by 1780 days.

(21) Appl. No.: 12/281,557

(22) PCT Filed: Jan. 30, 2007

(86) PCT No.: PCT/EP2007/050914
§ 371 (c)(1),
(2), (4) Date: May 4, 2009

(87) PCT Pub. No.: WO2007/101755
PCT Pub. Date: Sep. 13, 2007

(65) Prior Publication Data
US 2009/0222203 A1   Sep. 3, 2009

(30) Foreign Application Priority Data

Mar. 7, 2006   (DE) .................... 10 2006 010 478

(51) Int. Cl.
*G01C 21/36* (2006.01)
(52) U.S. Cl.
CPC ..... *G01C 21/3647* (2013.01); *G01C 21/3632* (2013.01)
(58) Field of Classification Search
CPC ............... G08G 1/096861; G01C 21/3647
USPC ........................................ 701/200
See application file for complete search history.

(56) References Cited

U.S. PATENT DOCUMENTS

| | | | |
|---|---|---|---|
| 6,285,317 B1 | 9/2001 | Ong | |
| 6,594,580 B1* | 7/2003 | Tada et al. | ..................... 701/211 |
| 7,039,521 B2* | 5/2006 | Hortner et al. | ............... 701/211 |
| 7,312,723 B2 | 12/2007 | Eggers et al. | |
| 8,103,442 B2* | 1/2012 | Akita | ................. G01C 21/3647 701/457 |
| 2005/0065721 A1 | 3/2005 | Herrtwich et al. | |
| 2006/0151223 A1 | 7/2006 | Knoll | |
| 2008/0186210 A1* | 8/2008 | Tseng | ........................ 340/995.26 |
| 2009/0125234 A1* | 5/2009 | Geelen et al. | ................ 701/209 |

(Continued)

FOREIGN PATENT DOCUMENTS

| | | |
|---|---|---|
| DE | 10138719 | 3/2003 |
| EP | 1519152 | 3/2005 |

(Continued)

OTHER PUBLICATIONS

International Search Report, PCT International Patent Application No. PCT/EP2007/050914, dated May 9, 2007.

*Primary Examiner* — Jonathan K Ng
(74) *Attorney, Agent, or Firm* — Norton Rose Fulbright US LLP; Gerard Messina

(57) ABSTRACT

A method and a system for displaying at least one navigation instruction of a navigation system in a vehicle, a section of the vehicle's surroundings being recorded by a camera and displayed as an image sequence of the surroundings by a display unit, the navigation instruction being likewise displayed by the display unit, and, when the vehicle is moving, the position of the at least one navigation instruction within the image sequence of the surroundings being changed as a function of the movement of the surroundings occurring relative to the vehicle.

20 Claims, 2 Drawing Sheets

(56) References Cited

U.S. PATENT DOCUMENTS

2010/0131197 A1* 5/2010 Zhang et al. .................. 701/209
2010/0153000 A1* 6/2010 Akita ................. G01C 21/3632
              701/429

FOREIGN PATENT DOCUMENTS

| JP | 09304101 | 11/1997 | | |
|----|----------|---------|---|---|
| JP | 9325042 | 12/1997 | | |
| JP | 11023305 | 1/1999 | | |
| JP | 2001241962 A | * | 9/2001 | ............ G01C 21/00 |
| JP | 2004/257979 | 9/2004 | | |
| WO | WO 03/064213 | 8/2003 | | |
| WO | WO 2004/047449 | 6/2004 | | |

* cited by examiner

METHOD AND SYSTEM FOR DISPLAYING NAVIGATION INSTRUCTIONS

FIELD OF THE INVENTION

The present invention relates to a method for displaying at least one navigation instruction provided by a navigation system of a vehicle, a section of the vehicle's surroundings being recorded by a camera and displayed by a display unit as an image sequence of the surroundings, and the navigation instruction ascertained as a function of a destination position and the current position of the vehicle likewise being displayed by the display unit. The present invention further relates to a system by which such a method may be implemented.

BACKGROUND INFORMATION

Video-based driver assistance systems, which display images recorded by a camera on a display, are used for assisting the drivers of motor vehicles. In this manner it is possible, for example, to assist the driver in detecting parking space boundaries or obstacles using a backup camera system when reverse parking. By using infrared-sensitive image sensors, as described in International Application No. WO 2004/047449 A1 for example, the driver may also be effectively assisted in connection with so-called night view systems even in conditions of poor visibility or poor weather conditions. An "automotive infrared night vision device" is also described in International Application No. WO 2003/064213 A1, which selectively displays a processed camera image of the area in front of the driver.

In order to assist the driver even further in such assistance systems, additional information is generated or retrieved and additionally drawn into the images recorded by the image sensor unit and displayed in the display unit. Thus, for example in a night view system having integrated lane detection, the lane of the vehicle or, in a backup camera system, assister lines for facilitating the parking process may be visually displayed as additional information in the display unit. Symbols or texts may also be generated and displayed as additional information. For this purpose, artificially generated graphical data are represented in the display unit together with the recorded images of the actual surrounding of the vehicle. A display or monitor may be preferably used as a display unit.

A method and system for displaying at least one navigational instruction are described in German Patent Application No. DE 101 38 719 A1. In this instance, navigation instructions are inserted into the images of the vehicle's surroundings that were recorded by a vehicle camera and represented in the display unit. The document also teaches to take the inclination of the vehicle along the longitudinal and lateral axis into account when generating the display.

Moreover, Japanese Patent No. JP 11023305 A1 describes that obstacles, which may exist in the form of stationary or moving objects as other vehicles for example, have inserted navigation instructions transparently superposed, rather than being covered by them.

Furthermore, Japanese Patent Documents JP 09325042 A1 and JP 2004257979 A1 also describe methods in which navigation instructions are displayed in a display unit, the distance of vehicle position and destination position being respectively taken into account for generating the display.

Thus, Japanese Patent Application JP 09325042 A1 describes, for example, inserting navigation arrows into an image recorded by a video camera, turn-off arrows being adjusted in their length to the distance to the turn-off point.

Japanese Patent Application No. JP 2004257979 A1 describes the insertion of turn-off instructions into a recorded image when the distance between the current vehicle position and the turn-off point is smaller than or equal to a specific value.

Navigation instructions inserted into displays are generally used to relieve the driver in complicated traffic situations and to help him generally achieve a better orientation. The advantages of navigation instructions are revealed particularly clearly when side streets follow one upon another closely in fast moving traffic.

The display unit in the form of a display integrated into a navigation device or a separate, usually smaller display situated in the cockpit of the vehicle normally presents navigation instructions in the form of arrows that are displayed statically. Navigation instructions may also be represented in a different form, however, as guiding beacons, warning beacons, direction beacons in curves, guide pole symbols or as traffic signs, for example.

SUMMARY

An object of the present invention is to provide a method and a system which allow the driver to perceive navigation instructions inserted into the displayed sequence of images of the vehicle's surroundings in a particularly realistic manner.

An example method according to the present invention may have the advantage that the driver is assisted in a particularly effective manner because the navigation instructions are inserted into the displayed image sequence of the vehicle's surroundings in such a realistic manner that the impression arises that they are part of the filmed surroundings of the vehicle. In the case of navigation instructions in the form of arrows, the impression may advantageously arise that they are applied directly on the roadway surface of the road in front of the vehicle. Compared to the actually filmed surroundings of the vehicle, the informational content perceived by the driver is in the process augmented by the driving recommendations supplied by the navigation system ("augmented reality").

According to the present invention, the position of the at least one navigation instruction inserted within the image sequence of the surroundings is changed as a function of the movement of the surroundings occurring relative to the vehicle when the vehicle is moving. In the process, the navigation instructions may be advantageously moved along with the content of the displayed image sequence of the surroundings. In order to achieve a particularly realistic impression of the driving recommendations, the navigation instructions may be displayed in perspective in the image sequence of the surroundings, the insertion occurring in this instance preferably in the region of the roadway located in front of the vehicle.

In accordance with an example system of the present invention, the position, calculated by the system, of the at least one navigation instruction within the displayed image sequence of the surroundings is variable as a function of the movement of the surroundings occurring relative to the vehicle. In such a system, the navigation instruction(s) may be shifted in such a way that a very realistic impression arises for the user of the system.

Both by the method according to the present invention as well as by the system according to the present invention, a safety gain is made as well since a driver who looks at the display unit for receiving a navigation instruction is at the same time able to remain attentive to the events on the road in front of him, the navigation instructions not being perceived as interfering foreign objects in the displayed video image of the vehicle's surroundings, but rather as a part of the surroundings. This gain in safety may be additionally amplified by a suitable position of the display unit, preferably as close as possible to the driver's primary field of vision since the so-called "eyes-off-the-road-time" is then particularly low. If the navigation instructions contain text information, e.g., street names or distance information, then these may also be represented in a conventional manner in the lower region or margin of the display unit, this information then not having to be moved. The same applies to distance information, which is displayable also in the conventional manner as relative distance bars.

Thus it is particularly advantageous if the navigation instruction(s) is or are moved uniformly along with the vehicle surroundings displayed in the image sequence when the vehicle surroundings move relative to the vehicle. The uniform movement advantageously has the effect of creating the impression for the user or driver that the at least one navigation instruction is shifted together with the roadway in front of the vehicle.

In this regard, it is furthermore advantageous if a navigation instruction may also be accordingly enlarged or reduced and/or changed in terms of its shape. Not only the movement, but also the change of the shape and/or the enlargement or reduction of the navigation instruction may occur in particular as a function of the vehicle speed and the direction of travel. In this manner, is becomes possible for the navigation instructions to be perceived by the user like real traffic signs or like directional arrows applied on the roadway without thereby coming too much to the fore and diverting attention too much from the actual events in the filmed surroundings.

Preferably, a provision is made for a navigation instruction to be moved with at least one pixel in accordance with at least one pixel of the displayed image sequence of the surroundings toward an image margin formed by the display unit or is moved away from it when the vehicle is traveling. In particular, a navigation instruction may also be moved with at least two pixels in accordance with at least two pixels of the image sequence of the surroundings, which in this instance may also have different directions of movement and/or speeds of movement.

It is furthermore particularly advantageous if a navigation instruction is represented in such a way, when reaching the lower and/or a lateral image margin, that it is moved beyond the image margin out of the displayed image sequence of the surroundings. Such a subducting representation achieves a particularly realistic illustration. When a predefined limit distance is reached between the navigation instruction and the image margin and/or when the navigation instruction is pushed out, another navigation instruction is preferably inserted in an especially central position on the display device, this additional driving instruction then being once more moved toward an image margin.

The advantages of the method and system of the present invention are revealed particularly clearly when the representation of the at least one navigation instruction is adapted to the horizontal and/or vertical course of the roadway ahead of the vehicle.

For this purpose, in particular when the vehicle is cornering, the at least one navigation instruction may be shifted and/or rotated, possibly even scaled down or enlarged, beginning from a starting position, which it would occupy if the vehicle were traveling straight-ahead, the change of position of the navigation instruction preferably occurring in such a way that it always lies tangentially on the trajectory predetermined for the vehicle.

Likewise, when the vehicle is traveling over uneven terrain, the at least one navigation instruction may be shifted and/or tilted, possibly even scaled down or enlarged, beginning from a starting position, which it would occupy if the vehicle were traveling along an even path, the change of position of the navigation instruction preferably occurring in such a way that it always lies tangentially on the roadway surface profile predetermined for the vehicle.

In both cases it is furthermore particularly advantageous if the navigation instruction, for example an arrow indicating direction, is represented not merely in a straight line along a tangent, but even adapted as precisely as possible to the actual course of the roadway ahead of the vehicle, i.e., arched and/or curved.

In any event, the impression that the symbols are actually located on the roadway surface is all the more pronounced the more precisely the actual course of the roadway is known. This is true both for the horizontal course with respect to curves as well as for the vertical course with respect to the elevation profile. In particular, the following three possibilities are available for ascertaining the course of the roadway:

The course of the lane and the roadway surface may be ascertained with the aid of image processing methods from the image data recorded by the camera. For example, lane markings may be detected and their course may be measured. Typically a clothoid model is assumed for the horizontal course. The vertical course (elevation profile) may also be determined from these data e.g. according to a quadratic model $y(z)=c_0+c_1z+c_2z^2$, where y is the elevation and z the distance with respect to the camera.

A second possibility is to retrieve the course of the lane and/or the road profile from the digital map data of the navigation system. The current position and the elevation of the vehicle are also very precisely known via GPS, DGPS or coupled navigation for example. Even if the elevation profile is, at this time at least, not completely digitized, this method may be used in the future, as soon as maps of digitized elevation data are sufficiently available. Via the elevation information, which is then associated with every digitization point of the road, it is then possible to reconstruct the road profile by suitable interpolation. Likewise, the horizontal course of the roadway in front of the vehicle, which is determined by curves, may be suitably interpolated in particular by splines and/or circular arcs and/or clothoids, sufficient digitized map data already existing for this purpose.

A third possibility for ascertaining the course of the roadway is to estimate the course of the roadway with the aid of sensors located in the vehicle. Thus, it is possible to estimate the trajectory in accordance with a model for the vehicle movement, for example, using acceleration sensors, preferably using ESP sensors, and/or by the steering angle and the vehicle speed.

It is furthermore particularly advantageous if navigation instructions are represented repeatedly along the course of the roadway ahead of the vehicle, the repetition occurring in particular periodically. It is also possible for two or more navigation instructions to be visible at the same time and to be moved respectively in the manner of the present invention in the displayed image sequence of the surroundings. The movement may be different for each navigation instruction in order to obtain an optimum display result.

It is favorable in this regard if the interval between two navigation instructions depends on the vehicle speed in such a way that the interval is greater at higher vehicle speeds and smaller at lower vehicle speeds. Accordingly, the number of inserted navigation instructions changes as well, which will be lower at higher vehicle speeds than when traveling more slowly such that the driver gets an impression that is as realistic as possible.

It is moreover particularly advantageous if, in the case of recorded objects moving relative to the vehicle and/or relative to the surroundings, which are recognized and displayed in the image sequence of the surroundings as an object image, in the region of a navigation instruction to be displayed, in such a way that there is an intersection between the object image and the navigation instruction, the respective navigation instruction is displayed either semitransparently superposed on the object image or is entirely blanked until there is no more intersection between the object image and the navigation instruction. In this manner, an additional safety gain may be achieved since the driver is able to discern the displayed video image of the vehicle surroundings without essential objects being covered.

For this purpose the objects are first detected using a suitable object detection device, for example in the form of a close range or long range radar using the Doppler effect. As is known, other sensor systems are also suitable for this purpose. The object detection device may also be hardware associated with the camera or other components of the system or of the navigation system, which is equipped with an object detection software. In particular, an image evaluation may also be performed for detecting objects. Advantageously, only those objects are detected that are relevant in terms of traffic and that are located on the roadway ahead of the vehicle, which may be other moving or stationary vehicles, for example, or persons or obstacles.

An especially preferred specific embodiment of the present invention provides for the method to be implemented in the context of a night vision system. If required, the display of navigation instructions in darkness, in this instance, may preferably be added to an already existing night vision image. In daylight, the image processing may be appropriately adjusted or switched off. The switchover may be controlled either manually or automatically, for instance using a light sensor and/or a clock.

BRIEF DESCRIPTION OF THE DRAWINGS

An example method according to the present invention and an example system are explained in greater detail below.

DETAILED DESCRIPTION OF EXAMPLE EMBODIMENTS

Figure 1:
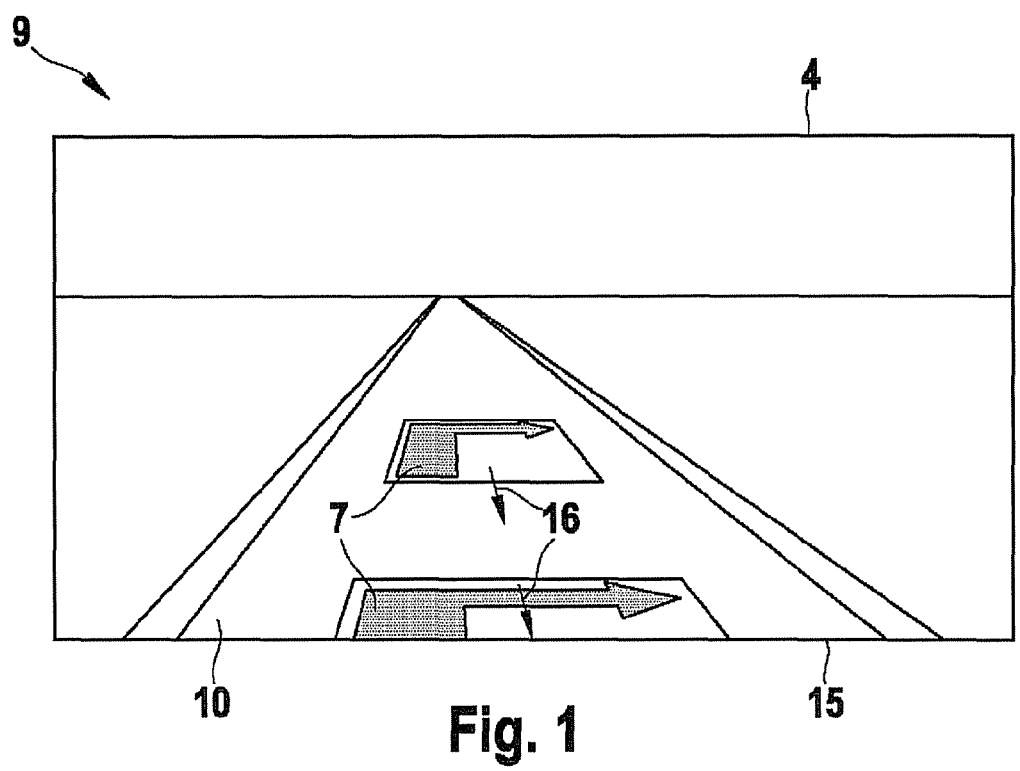
FIG. 1 shows an image of the vehicle surroundings represented by a display unit along with two navigation instructions.
Figure 2:
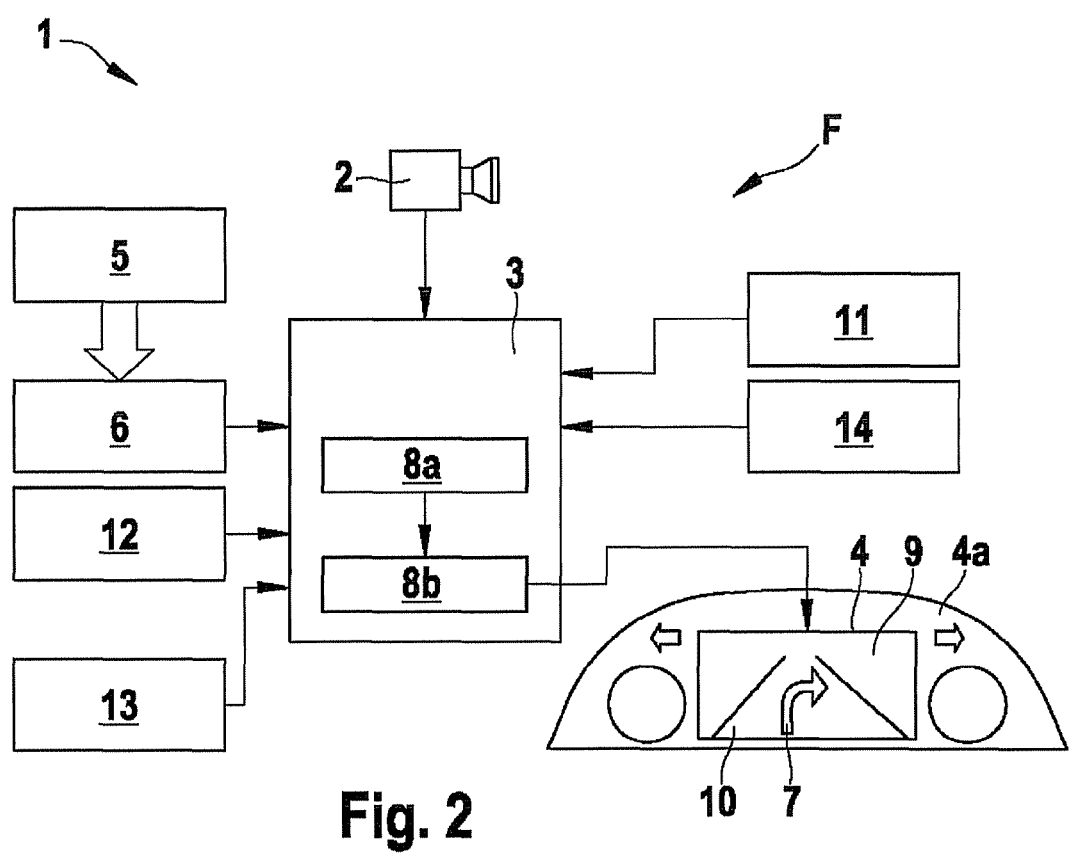
FIG. 2 shows a schematic structure of a system, according to the present invention, for displaying navigation instructions.

FIG. 2 shows a schematic illustration of the structure of a system 1 by which an example method according to the present invention may be implemented in a motor vehicle F to display the image shown in FIG. 1. The system includes a video camera 2, which may also be designed in the form of a night vision or IR camera, and which is connected via a video control device 3 to a display unit 4 having a conventional display. Display unit 4 may be designed in particular in combination with a night vision system. It may be positioned at any desired position in vehicle F, it being preferably located, however, in the area of the driver's primary field of view and possibly integrated into an instrument cluster 4a. System 1 further includes a navigation system having a navigation unit 5 that generates travel recommendation data 6 in a conventional manner, which are capable of being displayed as navigation instructions 7 on display unit 4. For this purpose, navigation unit 5 is also connected to video control unit 3. The connections may be established preferably using the CAN bus (CAN=controller area network) that is meanwhile used in standard fashion in vehicle construction, or using a MOST bus (MOST=media oriented system transport), or even using another serial field bus system. System 1 is suitable for upgrading navigation systems and night vision systems integrated into vehicle F.

On the basis of received data, for example in the form of GPS data, which are supported by data records on topography, road maps, etc., navigation unit 5 supplies travel recommendation data 6 to video control unit 3. Together with the image data of the vehicle's surroundings received from camera 2, video control unit 3 relays the data, which are processed using a calibration device 8a and a renderer 8b, to display unit 4 such that there image sequence 9 of the surroundings may be shown together with one or more inserted navigation instruction(s) 7.

The display of navigation instruction 7, e.g., in the form of an arrow, is preferably adjusted perspectively to the perspective of image sequence 9 of the surroundings, which depends on the location of camera 2 on vehicle F. For this purpose, one or more arrows 7 are inserted in the region of roadway 10 in front of vehicle F. This creates the impression that arrows 7 are situated directly on roadway surface 10 in front of vehicle F.

To reinforce this impression, video control unit 3 here compensates in image sequence 9 of the surroundings for the pitching motions of vehicle F measured by a sensor 11. Sensor 11 may be a pitch-angle sensor or a pitch-rate sensor or an acceleration sensor, but in particular an angle detection device shown in FIG. 2 in the form of a sensor 11 for aligning the vehicle's headlights.

To compensate the image, roadway surface 10 may alternatively be calculated from the image data using suitable algorithms, which utilize a lane detection system 12 shown here, which is likewise connected to video control device 3. Besides the pitching, the system may, of course, also compensate for the rolling of vehicle F. However, in the simplest case, a road surface 10 may be modeled from the static calibration of camera 4 without compensating for the pitch of vehicle F.

In system 1 shown in FIG. 2, video control device 3 is additionally supplied with digital map data or topography data 13 from a digital database, from which the further route is known. This allows for navigation instructions 7 to be adapted very well to the actual course of roadway 10. In addition, video control unit 3 is supplied with speed data 14 regarding the current speed of vehicle F, which are used for adapting the number and/or movement and/or change of navigation instructions 7.

FIG. 1 shows an image displayed by display unit 4 from an image sequence 9 of the surroundings recorded by camera 2. Into this image sequence 9 of the surroundings, two navigation instructions 7 are also inserted in the form of arrows, which indicate to the driver that he ought to turn right soon. These two arrows 7 are inserted in a perspective representation in the region of roadway 10 in front of vehicle F and move at a speed corresponding to driving speed 14 of vehicle F together with roadway 10 toward the lower image margin 15 where, represented in a subducting manner, they are pushed out of the image. The movement of the two navigation instructions 7 is respectively indicated by a smaller arrow 16 pointing downward. Navigation instructions 7 are at the same time enlarged. This creates the impression that arrows 7, used as navigation instruction, are permanently applied on roadway surface 10 and that vehicle F rolls over them.

As soon as an arrow 7 has disappeared at lower image margin 15, a new arrow 7 is inserted approximately at the center of the display at a position on display unit 4 that corresponds to a point on roadway 10 lying further away from vehicle F. This new arrow 7 is then also shifted within display unit 4 in such a way that again the impression is created that the new arrow 7 also moves with roadway surface 10 toward vehicle F.

Figure 3:
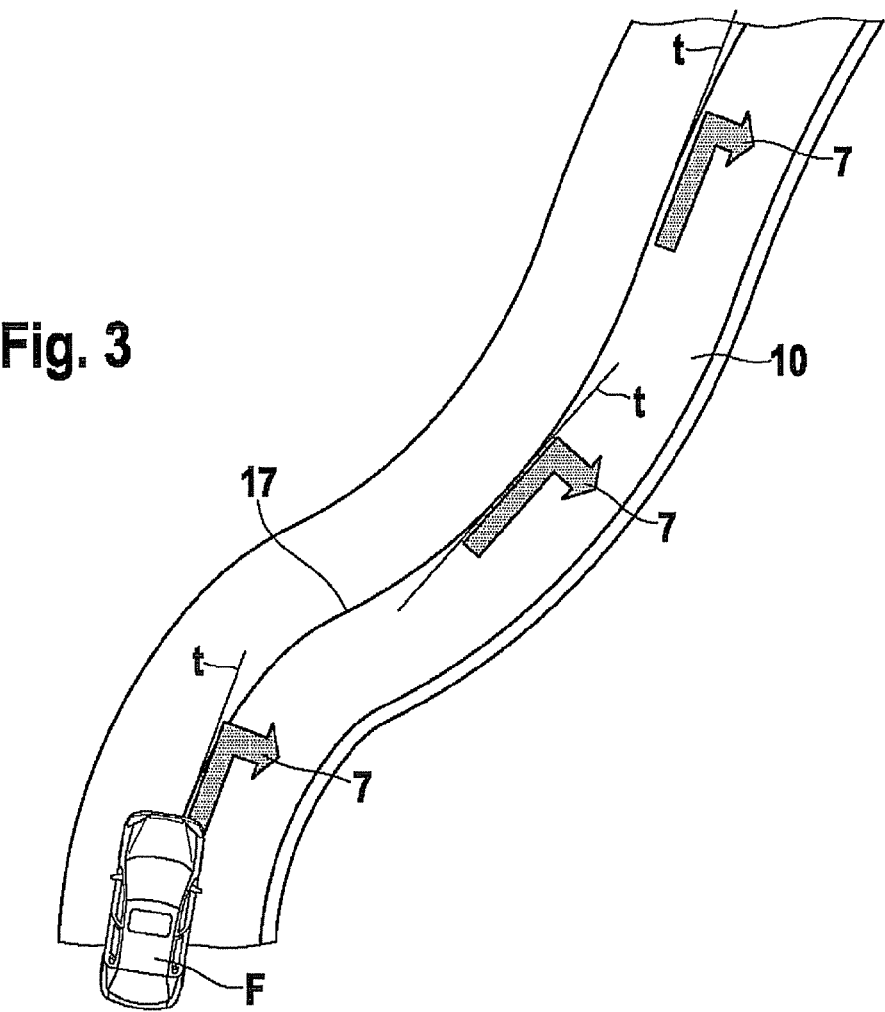
FIG. 3 shows a schematic of the shifting position of a navigation instruction while cornering.

FIG. 3 shows schematically how multiple navigation instructions 7 may be adapted to the horizontal course of roadway 10 in front of vehicle F, which is defined by multiple successive curves. In order to prevent navigation instructions 7 in the form of arrows from appearing alongside rather than on roadway 10 when cornering, the future course or the expected trajectory 17 of vehicle F and thus the path of motion for shifting navigation instructions in display unit 4 is estimated. This course 17 may also be calculated, at least for a certain stretch, with the aid of transverse acceleration measurements or by measuring the steering angle and the vehicle's speed. Furthermore, it is possible to estimate the trajectory merely from the steered steering angle of the vehicle's steering system. In addition, the information of the existing lane detection system 12 may also ensure the correct positioning and shifting of navigation instructions 7 within roadway 10.

Each navigation instruction 7 is turned in accordance with ascertained course 17 and oriented in such a way that navigation instruction 7 always lies tangentially on tangent t on the predetermined course 17 of vehicle F. Course 17 (trajectory) follows the course of roadway 10.

Figure 4:
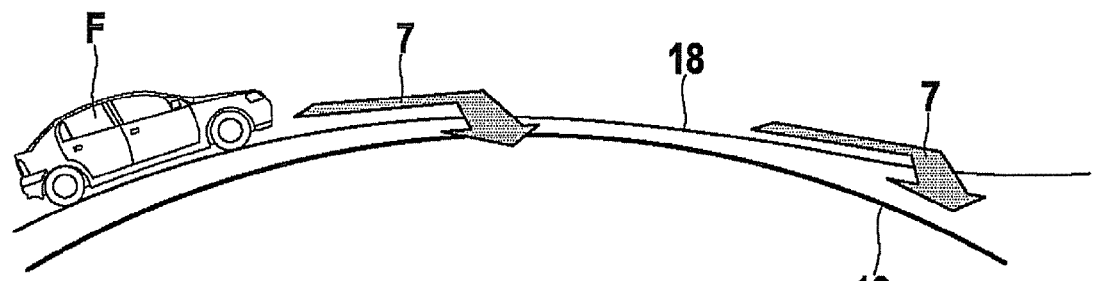
FIG. 4 shows a schematic of the shifting position of a navigation instruction when driving over hilly terrain.

FIG. 4 shows schematically a corresponding adaptation of navigation instructions 7 to the elevation profile 18 ahead of vehicle F, which may deviate from the course of calculated surface model 19. Here, navigation instructions 7 in the display unit are folded backward or forward, which may be achieved in particular by a graphical stretching or compression of navigation instructions 7 in the vertical direction of the display unit. For the driver to obtain the most realistic impression, the adaptation of the navigation instructions may occur simultaneously in the horizontal as well as in the vertical direction.

What is claimed is:

1. A method for displaying at least two navigation instructions of a navigation system in a vehicle, comprising:
    recording a section of surroundings of the vehicle using a camera;
    displaying as an image sequence the surroundings by a display unit;
    displaying the at least two navigation instructions by the display unit, wherein, when the vehicle is moving, positions of the at least two navigation instructions within the image sequence of the surroundings are changed as a function of a movement of the surroundings occurring relative to the vehicle;
    detecting at least one of a curve and a change in elevation in an expected trajectory of the vehicle; and
    adapting an appearance of at least one of the at least two navigation instructions so that:
    in the case of the detected curve, the at least one adapted navigation instruction is turned in accordance with the curve, and
    in the case of the detected change of elevation, the at least one adapted navigation instruction is at least one of stretched and compressed in accordance with the change in elevation,
    wherein the display unit displays the at least two navigation instructions in the image sequence simultaneously and repeatedly along a course of a roadway in front of the vehicle, and wherein a distance interval between the at least two navigation instructions is varied in dependence on a vehicle speed in such a way that a distance of the interval between the simultaneously displayed at least two navigation instructions increases along with an increase in the vehicle speed.

2. The method as recited in claim 1, wherein, when the surroundings of the vehicle are moving relative to the vehicle, the at least two navigation instructions are moved uniformly with the surroundings of the vehicle displayed in the image sequence of the surroundings.

3. The method as recited in claim 1, wherein when the vehicle is moving, the at least two navigation instructions are changed in at least one of size and shape.

4. The method as recited in claim 1, wherein, when the vehicle is moving, the at least two navigation instructions are moved with at least one pixel in accordance with at least one pixel of the displayed image sequence of the surroundings one of toward an image margin formed by the display unit or away from the image margin.

5. The method as recited in claim 4, wherein, when one of the at least two navigation instructions reaches at least one of a lower image margin and a lateral image margin, the one of the at least two navigation instructions is represented in such a way that it is moved out of the displayed image sequence of the surroundings.

6. The method as recited in claim 1, wherein representations of the at least two navigation instructions are adapted to at least one of a horizontal course of the roadway in front of the vehicle, and a vertical course of the roadway in front of the vehicle.

7. The method as recited in claim 1, wherein objects moving at least one of relative to the vehicle and relative to the surroundings are recorded, the objects being recognized and displayed in the image sequence of the surroundings as an object image, in a region of one of the at least two navigation instructions to be displayed, in such a way that when there is an intersection between the object image and the one of the at least two navigation instructions, the one of the at least two navigation instructions is displayed one of semi-transparently superposed on the object image, or entirely blanked until there is no more intersection between the object image and the one of the at least two navigation instructions.

8. A system for displaying at least two navigation instructions of a navigation system for a vehicle, comprising:
    a camera adapted to record a section of surroundings of the vehicle; and
    a navigation unit and a display unit, by which both the at least two navigation instructions and a recorded section of the vehicle's surroundings are representable as an image sequence of the surroundings, wherein, when the vehicle is moving, the at least two navigation instructions within the image sequence of the surroundings are variable in position calculated by the system as a function of movement of the surroundings occurring relative to the vehicle;

wherein the navigation unit detects one of a curve and a change in elevation in an expected trajectory of the vehicle, wherein the navigation unit adapts an appearance of at least one of the at least two navigation instructions so that:

in the case of the detected curve, the navigation unit turns the at least one adapted navigation instruction in accordance with the curve, and in the case of the detected change of elevation, the navigation unit at least one of stretches and compresses the at least one adapted navigation instruction in accordance with the change in elevation wherein the display unit displays the at least two navigation instructions in the image sequence simultaneously and repeatedly along a course of a roadway in front of the vehicle, and wherein a distance interval between the at least two navigation instructions is varied in dependence on a vehicle speed in such a way that a distance of the interval between the simultaneously displayed at least two navigation instructions increases along with an increase in the vehicle speed.

9. The system as recited in claim 8, wherein, when the surroundings of the vehicle are moving relative to the vehicle, the at least two navigation instructions are moved uniformly with the surroundings of the vehicle displayed in the image sequence of the surroundings.

10. The system as recited in claim 8, wherein when the vehicle is moving, the at least two navigation instructions are changed in at least one of size and shape.

11. The system as recited in claim 8, wherein, when the vehicle is moving, the at least two navigation instructions are moved with at least one pixel in accordance with at least one pixel of the displayed image sequence of the surroundings one of toward an image margin formed by the display unit or away from the image margin.

12. The method as recited in claim 11, wherein, when one of the at least two navigation instructions reaches at least one of a lower image margin and a lateral image margin, the one of the at least two navigation instructions is represented in such a way that it is moved out of the displayed image sequence of the surroundings.

13. The system as recited in claim 8, wherein representations of the at least two navigation instructions are adapted to at least one of a horizontal course of the roadway in front of the vehicle, and a vertical course of the roadway in front of the vehicle.

14. The system as recited in claim 8, wherein objects moving at least one of relative to the vehicle and relative to the surroundings are recorded, the objects being recognized and displayed in the image sequence of the surroundings as an object image, in a region of one of the at least two navigation instructions to be displayed, in such a way that when there is an intersection between the object image and the one of the at least two navigation instructions, the one of the at least two navigation instructions is displayed one of semi-transparently superposed on the object image, or entirely blanked until there is no more intersection between the object image and the one of the at least two navigation instructions.

15. The system as recited in claim 8, wherein, when the surroundings of the vehicle are moving relative to the vehicle, the at least two navigation instructions are moved uniformly with the surroundings of the vehicle displayed in the image sequence of the surroundings, and wherein when the vehicle is moving, the at least two navigation instructions are changed in at least one of size and shape.

16. The system as recited in claim 15, wherein, when the vehicle is moving, the at least two navigation instructions are moved with at least one pixel in accordance with at least one pixel of the displayed image sequence of the surroundings one of toward an image margin formed by the display unit or away from the image margin, and wherein, when one of the at least two navigation instructions reaches at least one of a lower image margin and a lateral image margin, the one of the at least two navigation instructions is represented in such a way that it is moved out of the displayed image sequence of the surroundings.

17. The system as recited in claim 15, wherein representations of the at least two navigation instructions are adapted to at least one of a horizontal course of the roadway in front of the vehicle, and a vertical course of the roadway in front of the vehicle, and wherein an interval between the at least two navigation instructions depends on a vehicle speed in such a way that the interval increases along with an increase in the vehicle speed.

18. The system as recited in claim 15, wherein objects moving at least one of relative to the vehicle and relative to the surroundings are recorded, the objects being recognized and displayed in the image sequence of the surroundings as an object image, in a region of one of the at least two navigation instructions to be displayed, in such a way that when there is an intersection between the object image and the one of the at least two navigation instructions, the one of the at least two navigation instructions is displayed one of semi-transparently superposed on the object image, or entirely blanked until there is no more intersection between the object image and the one of the at least two navigation instructions.

19. The method as recited in claim 1, wherein:
each simultaneously displayed navigation instruction is separately oriented within a plane of the roadway,
a first portion of the roadway exhibits a first curvature,
a second portion of the roadway exhibits a second curvature different than the first curvature,
a first one of the simultaneously displayed navigation instructions exhibits a first orientation that is matched to the first curvature by orienting the first one of the simultaneously displayed navigation instructions to lie tangentially to a tangent of the first curvature, and
a second one of the simultaneously displayed navigation instructions exhibits a second orientation that is different than the first orientation and is matched to the second curvature by orienting the second one of the simultaneously displayed navigation instructions to lie tangentially to a tangent of the second curvature.

20. The system as recited in claim 8, wherein:
each simultaneously displayed navigation instruction is separately oriented within a plane of the roadway,
a first portion of the roadway exhibits a first curvature,
a second portion of the roadway exhibits a second curvature different than the first curvature,
a first one of the simultaneously displayed navigation instructions exhibits a first orientation that is matched to the first curvature by orienting the first one of the simultaneously displayed navigation instructions to lie tangentially to a tangent of the first curvature, and
a second one of the simultaneously displayed navigation instructions exhibits a second orientation that is different than the first orientation and is matched to the second curvature by orienting the second one of the simultaneously displayed navigation instructions to lie tangentially to a tangent of the second curvature.

* * * * *